United States Patent Office 3,629,416
Patented Dec. 21, 1971

3,629,416
METHOD OF TREATING OR PREVENTING COCCIDIOSIS WITH THIOSEMICARBAZONE DERIVATIVES
Paul Anthony Barrett, London, England, assignor to Burroughs Wellcome Co.
No Drawing. Original application July 21, 1965, Ser. No. 473,867, now Patent No. 3,478,035, dated Nov. 11, 1969. Divided and this application Mar. 12, 1969, Ser. No. 806,676
Int. Cl. A61k 27/00
U.S. Cl. 424—248
24 Claims

ABSTRACT OF THE DISCLOSURE

A method of treating or preventing coccidiosis in an animal which comprises administering to the animal an effective amount of a compound $$R^1-C=N.NH.CS.NH.A.NR_2^3$$
$$R^2-C=N.NH.CS.NH.A.NR_2^3$$

or a pharmaceutically acceptable acid addition salt thereof where $R^1$ is selected from the class consisting of hydrogen, lower alkyl, cyclohexyl, benzyl, lower alkoxy lower alkyl, acetoxymethyl and phenyl, $R^2$ is selected from the class consisting of hydrogen, lower alkyl, benzyl and phenyl, A is alkylene having 1 to 8 preferably 1 to 5 carbon atoms and $NR^3_2$ is selected from the class consisting of dialkylamino, pyrrolidino, piperidino and morpholino.

---

This application is a division of U.S. application Ser. No. 473,867 filed July 21, 1965, now U.S. Pat. No. 3,478,035.

The present invention relates to α-dithiosemicarbazones having biological activity.

It has been found that the compounds of Formula I below and acid addition salts thereof are active against coccidiosis.

$$R^1-C=N.NH.CS.NH-A-NR_2^3$$
$$R^2-C=N.NH.CS.NH-A-NR_2^3 \quad (I)$$

In Formula I, $R^1$ is a hydrogen atom or an alkyl, cyclohexyl, benzyl, alkoxyalkyl, acetoxymethyl or phenyl group, $R^2$ is a hydrogen atom or an alkyl, benzyl or phenyl group, A is divalent straight or branched alkylene group of 1 to 8 carbon atoms (preferably 2–5), and $-NR^3_2$ is a dialkylamino, pyrrolidino, piperidino or morpholino group. In general the activity is of a lower order when both $R^1$ and $R_2$ are hydrogen atoms though the two compounds glyoxal di-4-β-pyrrolidinoethylthiosemicarbazone (911C62) and glyoxal di-[4-(γ-dibutylaminopropyl) thiosemicarbazone] (788C62) are exceptions to this rule. The acid which may be associated with the dithiosemicarbazone of Formula I is not critical for the biological activity and any acid may be used which is non-toxic and pharmaceutically acceptable, for, example hydrochloric acid or oxalic acid.

The preferred compounds for activity against coccidiosis are acetylbenzoyl di - (4 - β-diethylaminoethylthiosemicarbazone) (183C62)
diacetyl di-(4 - β - dimethylaminoethylthiosemicarbazone) (705C62),
acetylbenzoyl di-(4-β-dimethylaminoethylthiosemicarbazone) (957C62),
diacetyl di-(4-β-morpohlinoethylthiosemicarbazone) (207C64),
dipropionyl di-(4-β-dimethylaminoethylthiosemicarbazone) (235C64),
diacetyl di-(4-γ-morpholinopropylthiosemicarbazone) (272C64),
diacetyl di-[4-(β-piperidinoethyl)thiosemicarbazone] (663C62),
1-phenylbutane-1,2-dione di-(4-β-dimethylaminoethylthiosemicarbazone) (411C64),
octane-4,5-dione di-(4-β-dimethylaminoethylthiosemicarbaoen) (529C64),
acetylbenzoyl di-(4-γ-diethylaminopropylthiosemicarbazone) (236C64),
pentane-2,3-dione di-(4-β-dimethylaminoethylthiosemicarbazone) (294C64),
glyoxal di-[4-(γ-dibutylaminopropyl)thiosemicarzazone] (788C62), and
α-methoxyethylglyoxal di-(4-β-diethylaminoethylthiosemicarbazone) (956C62).

Thus the present invention provides the compounds of Formula I, and in particular the preferred compounds, named above.

The compounds of Formula I may be made by reacting in acid solution two molecular proportions of a 4-substituted thiosemicarbazide of the formula $$H_2N.NH.CS.NH.A.NR_2^3$$

with a glyoxal derivative of the formula $R^1Co.Co.R^2$, wherein $R^1$, $R^2$, $R^3$ and A have the above defined meanings, or one molecular proportion of the 4-substituted thiosemicarbazide with the corresponding α-diketone mono - (4 - substituted-thiosemicarbazone). The reaction may be effected by heating the reactants together in a solvent wherein both of the reactants are soluble, and preferably at a slightly acidic pH. Thus ethanol or aqueous ethanol with an acid such as hydrochloric or acetic acid may be a suitable solvent. The resulting compounds are in general soluble substances in the form of their acid addition salts and the mixture may need to be made basic and cooled before the basic substance precipitates. The compounds can then be separated and purified by conventional techniques.

Thus in another aspect the present invention provides a method for preparing the compounds of Formula I substantially as described above.

Alternatively the compounds of Formula I may be synthesised by reacting 2 molecules of the appropriate dialkylaminoalkylamine with one molecule of the appropriate substituted glyoxal bis (methylcarbodithioylhydrazone) according to the reaction scheme $$R^1-C=N.NH.CS.SCH_3$$
$$R^2-C=N.NH.CS.SCH_3 + 2NH_2-A-NR_2^3 \longrightarrow$$
$$R^1-C=N.NH.CS.NH-A-NR_2^3$$
$$R^2-C=N.NH.CS.NH-A-NR_2^3$$

This reaction may be carried out by heating the reactants together in a solvent.

Thus in another aspect the present invention provides this alternative method of synthesis of the compounds of Formula I.

As stated above the compounds of Formula I have activity against coccidiosis.

Coccidiosis is a disease of considerable economic importance in domestic animals throughout the world, particularly in all forms of poultry, and is caused by members of the genera Eimeria and Isospora of the taxonomic group Coccidia.

The activity of the compounds was first detected by orally administering the compounds to chicks infected with *Eimeria tenella*: the compounds were effected in halting the development of the disease. The compounds were also found to be active against *Eimeria acervulina*, *E. brunetti*, *E. maxima* and *E. necatrix* in poultry both in preventing the disease developing in birds at risk and in halting the development of the disease in infected birds. They were also active against coccidia in other animals.

Thus in yet another aspect the present invention provides a method of treating or preventing coccidiosis in domestic animals which comprises the oral administration of a compound of Formula I.

The compounds may be administered to the animal as a pharmaceutical formulation or as an additive to its food or drink, either alone or in combination with other coccidiostatic agents, with pharmaceutical carriers and excipients, or with other additives such as antibiotics and vitamins. Thus the compounds may be presented in the form of a standard pharmaceutical formulation or as an additive, as a concentrated food "pre-mix" containing the drug in a diluted form, or as a food containing the compound. The concentration should be such that the bird finally receives 0.001 to 0.1% by weight of the drug in its food for prophylactic use and a similar concentration in its drink for therapeutic use. It will be appreciated that if the compounds are used in conjunction with other coccidiostatic agents the concentration may be lower.

Thus in still one further aspect the present invention provides a formulation for oral administration to animals which contains a compound of Formula I.

A further activity of compounds of Formula I is against anaplasmosis in cattle.

The disease, anaplasmosis, against which these compounds show activity, is a serious systemic disease of cattle which is prevalent in large areas of the Asian, African, Australasian, and American continents and certain Southern areas of Europe which have a Mediterranean type of climate. The infecting anaplasm organism attacks the red blood cells of the cattle characteristically causing anaemia, general debility, and fever of the animal, which often prove fatal. The infecting anaplasm organism has not yet been fully characterised; it may be a protozoon but is believed more likely to be related to the rickettsiae. There are two species in cattle which are known as *Anaplasma marginale* and *Anaplasma centrale* the former being the more virulent. A milder form of anaplasmosis also affects sheep and goats in areas such as the Middle East, South Africa, and the United States of America.

According to the present invention in another aspect there is provided a method of treating animals suffering from anaplasmosis, which comprises the administration of a glyoxal dithiosemicarbazone of Formula I to the host.

As with the coccidiostatic activity, compounds wherein both $R^1$ and $R^2$ are hydrogen atoms have a lower order of activity than the other compounds of the general formula. The preferred compounds of Formula I for the treatment of anaplasmosis are diacetyl di-(4-β-dimethylaminoethylthiosemicarbazone) (705C62), methoxymethylglyoxal di-(4-β - diethylaminoethylthiosemicarbazone) (626C62), and α-methoxyethylglyoxal di-(4-β - diethylaminoethylthiosemicarbazone) (956C62).

The compounds may be presented either orally or parenterally, and the actual dose of the compound of Formula I required for treatment will vary somewhat according to the actual compound used, the method of administration and the size of the animal being treated. For cattle the doses will probably be in the range 5 mg./kg. to 150 mg./kg., for example 2 doses of 30 mg./kg. given orally. When given parenterally the compounds are active at smaller doses.

The compounds of Formula I may be presented in a pharmaceutical formulation. For example, the oral formulations may be tablets, capsules, granules, powder, suspension, solutions, or emulsions which may contain diluents, binding agents, dispersing agents, surface-active agents, lubricating agents, coating materials, flavouring agents, colouring agents, solvents, thickening agents, suspending agents, or other pharmaceutically acceptable additives, and these formulations may be presented in unit-dose form or multi-dose form or as additives to feed-stuffs. The injectable form may be an aqueous or non-aqueous solution, suspension or emulsion in a pharmaceutically acceptable liquid or mixture of liquids, which may contain bacteriostatic agents, antioxidants, buffers, solutes to render the solution isotonic with the blood, thickening agents, suspending agents, or other pharmaceutically acceptable additives. Such formulations are presented in unit forms such as ampoules or disposable injection devices, or in multidose forms such as a bottle from which the appropriate doses may be withdrawn. All such formulations should preferably be rendered sterile.

Thus in another aspect the invention provides pharmaceutical formulations containing a compound of Formula I.

The pharmaceutical formulations may be prepared by any of the standard methods of pharmacy and in yet one further aspect the present invention provides a method of making a pharmaceutical formulation containing a compound of Formula I which comprises the incorporation of the compound into the formulation by known techniques.

Yet another activity of the compounds of Formula I is against *Aegyptianella pullorum* in chicks. The following compounds were tested using 3 doses of 10 mg./kg. given intramuscularly:

methylglyoxal di-[4-(β-dimethylaminoethyl)thiosemicarbazone] (530C62),
acetylbenzyl di-(4-β-dimethylaminoethylthiosemicarbazone) (957C62),
diacetyl di-(4-β-dimethylaminoethylthiosemicarbazone) (705C62), and
acetylbenzoyl di-[4-(β-dimethylaminoethyl)thiosemicarbazone] (183C62).

The first two of these, 530C62 and 957C62, are the preferred compounds against *Aegyptianella pullorum*.

Still one further activity of the compounds of Formula I is against *Babesia rodhaini*. Infected mice were subcutaneously injected with the compound using 25 mg./kg. The following compounds were tested and found active:

methoxymethylglyoxal di-(4-β-dimethylaminoethylthiosemicarbazone) (528C63),
methylglyoxal di-[4-(β-dimethylaminoethyl)thiosemicarbazone] (530C62),
acetylbenzoyl di-(4-β-dimethylaminoethylthiosemicarbazone) (957C62),
diacetyl di-[4-(γ-dimethylaminopropyl)thiosemicarbazone] (630C62), and
diacetyl di(-4-β-dimethylaminoethylthiosemicarbazone) (705C62).

The first two of these, 528C64 and 530C62, were the most active against *Babesia rodhaini*.

The invention will now be particularly described with reference to the compounds of Formula I and formulations containing them.

Whenever the abbreviations Ph, Me, Et, and Bu occur they denote phenyl, methyl, ethyl and n-butyl respectively. The symbols $R^1$, $R^2$, $R^3$ and A have the same meanings as hereinbefore defined.

EXAMPLES

Example 1

Acetophenone methyldithiocarbazate (112 g.) (prepared by the method of Kazakob and Postovakii, Doklady Akad Nauk. S.S.S.R., 1960. 134, 824—abstracted in C.A. 1961 55, 6483a) and diethylaminoethylamine (58 g.) in methanol (500 ml.) were boiled under reflux for 5 hours. The solvent was then removed by distillation in vacuo. The residual oil solidified and was recrystallised from light petroleum (B.P. 60–80° C.) to give acetophenone 4-β-diethylaminoethyl-thiosemicarbazone (B.W. ref. no. 137C62), M.P. 82–83° C.

Acetophenone 4-β-diethylaminoethyl-thiosemicarbazone (43.8 g.) was dissolved in water (300 ml.) by the addition of concentrated hydrochloric acid (15 ml.). The mixture was then steam distilled until no further acetophenone distilled over. The residual aqueous solution of 4-β-diethylaminoethylthiosemicarbazide was cooled and acetylbenzoyl (11.1 g.) was added, together with sufficient ethanol to give a homogeneous solution when the mixture was heated to its boiling point. The mixture was boiled under reflux for half an hour, cooled, and basified by addition of saturated sodium carbon solution. The lewwo oil which separated soon solidified and was filtered off, washed with water, and recrystallised from aqueous ethanol to give acetylbenzoyl di-(4-β-diethylaminoethylthiosemicarbazone) (B.W. ref. No. 183C62) as yellow prisms, M.P. 138–139°.

Examples 2–53

By the method as described in the first paragraph of Example 1 the following novel intermediates of the general formula $Ph(CH_3)C:N.NH.CS.NH—A—NR_2^3$ were prepared.

| Intermediate Example | —A— | $NR_{23}$ | Solvent for crystallisation | Melting point, °C. |
|---|---|---|---|---|
| i | —[CH₂]₂— | NMe₂ | ethanol | 108–110 |
| ii | —[CH₂]₂— | Pyrrolidino | do | 125–127 |
| iii | —[CH₂]₂— | Piperidino | do | 151 |
| iv | —[CH₂]₂— | Morpholino | do | 152 |
| v | —[CH₂]₃— | NMe₂ | light petroleum B.P. 80–100° C. | 96 |
| vi | —[CH₂]₃— | NEt₂ | Light petroleum B.P. 60–80° C. | 78 |
| vii | —[CH₂]₃— | Pyrrolidino | Ethanol | ¹ 177–781 |
| viii | —[CH₂]₃— | Morpholino | Light petroleum B.P. 60–80° C. | 105 |
| ix | —[CH₂]₃— | NBu₂ | Ethyl acetate | ¹ 85 |
| x | —CH[CH₂]₃— CH₃ | NEt₂ | Light petroleum B.P. 60–80° C. | 60–61 |

¹ Acid oxalate.

Using one of these intermediates and the appropriate glyoxal of formula $R^1CO.CO.R^2$ the following dithiosemicarbazones were prepared according to the method described in the second paragraph of Example 1.

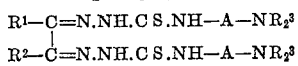

| Example | B.W. ref. No. | R¹ | R² | —A— | NR₂³ | Solvent for crystallisation | M.P., °C. | DiHC¹ M.P. °C. |
|---|---|---|---|---|---|---|---|---|
| 2 | 530C62 | CH₃ | H | —[CH₂]₂— | NMe₂ | Aq. ethanol | 158–9 | |
| 3 | 705C62 | CH₃ | CH₃ | —[CH₂]₂— | NMe₂ | Ethanol | 196 | |
| 4 | 957C62 | Ph | CH₃ | —[CH₂]₂— | NMe₂ | do | 167 | |
| 5 | 181C61 | CH₃ | H | —[CH₂]₂— | NEt₂ | Aq. ethanol | 148 | 205 |
| 6 | 182C62 | CH₃ | CH₃ | —[CH₂]₂— | NEt₂ | do | | 218 |
| 7 | 626C62 | CH₃OCH₂ | H | —[CH₂]₂— | NEt₂ | Ethanol | 165 | 189 |
| 8 | 956C62 | CH₃OCH(CH₃) | H | —[CH₂]₂— | NEt₂ | do | 174 | 182 |
| 9 | 990C62 | CH₃COOCH₂ | H | —[CH₂]₂— | NEt₂ | do | 180 | |
| 10 | 911C62 | H | H | —[CH₂]₂— | Pyrrolidino | do | 206 | |
| 11 | 912C62 | CH₃ | H | —[CH₂]₂— | do | Aq. ethanol | 194 | |
| 12 | 913C62 | CH₃ | CH₃ | —[CH₂]₂— | do | Ethanol | 220 | |
| 13 | 914C62 | Ph | CH₃ | —[CH₂]₂— | do | do | 175 | |
| 14 | 631C62 | CH₃ | H | —[CH₂]₂— | Piperidino | do | 226 | |
| 15 | 663C62 | CH₃ | CH₃ | —[CH₂]₂— | do | do | 235 | |
| 16 | 664C62 | CH₃ | H | —[CH₂]₂— | Morpholino | do | 217 | |
| 17 | 588C62 | CH₃ | CH₃ | —[CH₂]₃— | NMe₂ | do | 163–4 | |
| 18 | 630C62 | CH₃ | CH₃ | —[CH₂]₃— | NMe₂ | Aq. ethanol | 162–3 | |
| 19 | 589C62 | CH₃ | H | —[CH₂]₃— | NEt₂ | Ethanol | 165 | |
| 20 | 667C62 | CH₃ | CH₃ | —[CH₂]₃— | NMe₂ | do | 192 | |
| 21 | 704C62 | CH₃ | H | —[CH₂]₃— | Piperidino | do | 181–2 | |
| 22 | 702C62 | CH₃ | H | —[CH₂]₃— | Morpholino | do | 187 | |
| 23 | 788C62 | H | H | —[CH₂]₃— | NBu₂ | do | 195 | |
| 24 | 755C62 | CH₃ | H | —[CH₂]₃— | NBu₂ | Petrol (B.P. 60–80°) | 115–6 | |
| 25 | 781C62 | CH₃ | CH₃ | —[CH₂]₃— | NBu₂ | do | 136–7 | |
| 26 | 805C62 | CH₃ | H | —CH[CH₂]₃— CH₃ | NEt₂ | Ether/petrol mixture | 123 | |
| 27 | 752C62 | CH₃ | CH₃ | —CH[CH₂]₃— CH₃ | NEt₂ | Acetate/petrol mixture | 180 | |
| 28 | 148C62 | Ph | CH₃ | —[CH₂]₃— | NMe₂ | Benzene/petrol mixture | 127–8 | |
| 29 | 207C62 | CH₃ | CH₃ | —[CH₂]₃— | Morpholino | Cellosolve | 230 | |
| 30 | 208C62 | Ph | CH₃ | —[CH₂]₃— | do | Ethanol | 185–6 | |
| 31 | 235C62 | C₂H₅ | C₂H₅ | —[CH₂]₂— | NMe₂ | do | 207 | |
| 32 | 236C64 | Ph | CH₃ | —[CH₂]₃— | NEt₂ | do | | ¹ 143 |
| 33 | 237C64 | Ph | CH₃ | —CH[CH₂]₃— CH₃ | NEt₂ | do | | ¹ 150 |
| 34 | 271C64 | Ph | CH₃ | —[CH₂]₂— | Piperidino | do | 211 | |
| 35 | 272C64 | CH₃ | CH₃ | —[CH₂]₃— | Morpholino | do | 203 | |
| 36 | 273C64 | Ph | CH₃ | —[CH₂]₃— | do | do | 133 | |
| 37 | 274C62 | (²) | H | —[CH₂]₂— | NEt₂ | Aq. ethanol | | ¹ 145–7 |
| 38 | 294C64 | C₂H₅ | CH₃ | —[CH₂]₂— | NMe₂ | Ethanol | 192 | |
| 39 | 295C64 | (³) | H | —[CH₂]₂— | NMe₂ | do | 194 | |
| 40 | 296C64 | (³) | Ph | —[CH₂]₂— | NMe₂ | do | 174–5 | |
| 41 | 367C62 | (³) | Benzyl | —[CH₂]₂— | NMe₂ | Aq. ethanol | | 248 |
| 42 | 380C64 | (³) | CH₃ | —[CH₂]₂— | NMe₂ | Ethanol | 179 | |
| 43 | 411C64 | Ph | C₂H₅ | —[CH₂]₂— | NMe₂ | do | 137 | |

¹ Dioxalate. ² Cyclohexyl. ³ Benzyl.

Example 44.—A hot solution of methyl dithiocarbazinate (42 g.) in ethanol (100 ml.) containing 5 drops of concentrated hydrochloric acid was prepared and to this a solution of diacetyl (14.8 g.) in ethanol (400 ml.) was added dropwise with stirring over a period of 15 minutes. Butane-2,3-dione bis(methylcarbodithioyl hydrazone) began to separate during the addition. The mixture was heated under reflux for a further 1 hour and then the hydrazone was filtered off and washed with hot ethanol. It had a melting point of 220° C. with decomposition.

A mixture of this butane-2,3-dione bis(methylcarbodithioylhydrazone) (4 g.) with β-dimethylaminoethylamine (4 g.) in ethanol (20 ml.) was boiled under reflux for 8 hours. After cooling, the mixture was filtered. The solid was dissolved in 0.5 N hydrochloric acid (50 ml.), some insoluble material was filtered off and discarded, the solution was made basic by addition of sodium carbonate solution, and the precipitated base was filtered off, dried, and re-crystallised from ethanol to give butane-2,3-dione di - (4 - β - dimethylaminoethylthiosemicarbazone) (B.W. ref. No. 705C62) which had a melting point of 196° C. with decomposition: this was identical with the material described in Example 3.

Example 45.—According to the method of Example 44, butane-2,3-dione bis-(methyl - carbodithioyl hydrazone)

and β-morpholinoethylamine were reacted to give diacetyl di-4-β-morpholinoethylthiosemicarbazone (B.W. ref. No. 207C64) M.P. 230° C. after recrystallisation from Cellosolve: this was identical with the material described in Example 29.

Example 46.—Benzil bis-(methylcarbodithioyl hydrazone), M.P. 180–181° C. (decomp.) was prepared by a similar method to that described in the first part of Example 44, then 12 g. of this were reacted with β-dimethylaminoethylamine (45 g.) in ethanol (45 ml.) by boiling under reflux for 1 hour. The ethanol and excess β-dimethylaminoethylamine were distilled off under a water pump vacuum. The solid residue was boiled with ethanol and filtered off to give benzil bis-4-β-dimethylaminoethylthiosemicarbazone (B.W. ref. No. 666C64) as pale yellow crystals M.P. 221–223° C. (Decomp.).

Example 47.—According to the method of Example 46 benzil bis-methylcarbodithioyl hydrazone and β-diethylaminoethylamine were reacted together to give benzil bis-4-β-diethylaminoethylthiosemicarbazone (B.W. ref. No. 869C64), M.P. 167° C. after recrystallisation from ethanol.

Example 48.—By the method as described in Example 44, 1-phenylpropane-1,2-dione bis-(methylcarbodithioyl hydrazone) (M.P. 192° C. with decomposition) was prepared and reacted with β-dimethylaminoethylamine to give acetylbenzoyl di - 4-β-dimethylaminoethylthiosemicarbazone (B.W. ref. No. 957C62) M.P. 167° C., after recrystallisation from ethanol. This was identical with the material described in Example 4.

Example 49.—An oily injection suspension of diacetyl di - (4-β-dimethylaminoethylthiosemicarbazone) (Examples 3 and 44) was prepared by incorporating the previously sterilised drug into previously sterilised arachis oil and ball milling the drug down to particle size of 5μ or less. The concentration used was 1.0 mg. of drug per ml. of suspension. The suspension was then put into the final container under aseptic conditions.

Example 50.—A wettable powder for making into drenches for cattle was made up as follows:

| Component: | Percent by weight |
| --- | --- |
| Diacetyl di-(4-β-dimethylaminoethylthiosemicarbazone) | 90 |
| Cetrimide B.P. (surface active agent) | 0.5 |
| Sucrose | 9.5 |

The drench can be prepared by weighing out the appropriate quantity of powder and adding this to water.

What is claimed:
1. A method for treating coccidiosis in poultry which comprises administering to the poultry an effective coccidiosis treatment amount of a compound

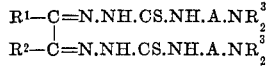

or a pharmaceutically acceptable acid addition salt thereof where $R^1$ is selected from the class consisting of hydrogen, lower alkyl, cyclohexyl, benzyl, lower alkoxy lower alkyl, acetoxymethyl and phenyl, $R^2$ is selected from the class consisting of hydrogen, lower alkyl, benzyl and phenyl, A is alkylene having 1 to 8 carbon atoms and $NR^3_2$ is selected from the class consisting of diloweralkylamino, pyrrolidino, piperidino and morpholino.

2. A method according to claim 1 in which the compound or the salt thereof is administered orally.

3. A method according to claim 1 in which the compound is diacetyl di-[4-(β-piperidinoethyl)thiosemicarbazone].

4. A method according to claim 1 in which the compound or the salt thereof is mixed with a pharmacologically acceptable carrier.

5. A method according to claim 2 in which .001% to .1% by weight of the compound is administered.

6. A method of preventing coccidiosis in poultry which comprises administering to the poultry an effective coccidiosis prevention amount of a compound or a pharmaceutically acceptable acid addition salt thereof where $R^1$ is selected from the class consisting of hydrogen, lower alkyl, cyclohexyl, benzyl, lower alkoxy lower alkyl, acetoxymethyl, and phenyl, $R^2$ is selected from the class consisting of hydrogen, lower alkyl, benzyl and phenyl, A is alkylene having 1 to 8 carbon atoms and $NR^3_2$ is selected from the class consisting of di lower alkylamino, pyrrolidino, piperidino and morpholino.

7. A method according to claim 6 in which the compound or the salt thereof is orally administered.

8. A method according to claim 7 in which .001% to .1% by weight of the compound is administered.

9. A method according to claim 1 in which the compound is selected from the class consisting of acetylbenzoyl di-(4-β-diethylamnioethylthiosemicar-
diacetyl di-(4-β-dimethylaminoethylthiosemicarbazone),
acetylbenzoyl di-(4-β-dimethylaminoethylthiosemicarbazone),
diacetyl di-(4-β-morpholinoethylthiosemicarbazone),
dipropionyl di-(4-β-dimethylaminoethylthiosemicarbazone),
diacetyl di(4-γ-morpholnopropylthiosemicarbazone),
diacetyl di-[4-(β-piperidionethyl)thiosemicarbazone],
1-phenylbutane-1,2-dione di(4-β-dimethylaminoethylthiosemicarbazone),
octane-4,5-dione di-(4-β-dimethylaminoethylthiosemicarbazone),
acetylbenzoyl di-(4-γ-diethylaminopropylthiosemicarbazone),
pentane-2,3-dione di-(4-β-dimethylaminoethylthiosemicarbazone),
glyoxal di-[4-(γ-dibutylaminopropyl)thiosemicarbazone], and
α-methoxyethylglyoxal di-(4-β-diethylaminoethylthiosemicarbazone).

10. A method according to claim 9 in which a pharmaceutically acceptable acid addition salt of the compound is administered.

11. A method according to claim 6 in which the compound is selected from the class consisting of acetylbenzoyl di-(4-β-diethylaminoethylthiosemicarbazone),
diacetyl di-(4-β-dimethylaminoethylthiosemicarbazone),
acetylbenzoyl di-(4-β-dimethylaminoethylthiosemicarbazone),
diacetyl di-(4-β-morpholinoethylthiosemicarbazone),
dipropionyl di-(4-β-dimethylaminoethylthiosemicarbazone),
diacetyl di(4-γ-morpholinopropylthiosemcarbazone),
diacetyl di-[4-(β-piperidinoethyl)thiosemicarbazone],
1-phenylbutane-1,2-dione di-(4-β-dimethylaminoethylthiosemicarbazone),
octane-4,5-dione di-(4-β-dimethylaminoethylthiosemicarbazone),
acetylbenzoyl di-(4-γ-diethylaminopropylthiosemicarbazone),
pentane-2,3-dione di-(4-β-dimethylaminoethylthiosemicarbazone),
glyoxal di-[4-(γ-dibutylaminopropyl)-thiosemicarbazone], and
α-methoxyethylglyoxal di-(4-β-diethylaminoethylthiosemicarbazone).

12. A method according to claim 11 in which a pharmaceutically acceptable acid addition salt of the compound is administered.

13. A method according to claim 11 in which the compound is administered orally.

14. A method according to claim 12 in which the compound is administered orally.

15. A method according to claim 6 in which the alkylene has 2 to 5 carbon atoms.

16. A method of treating coccidiosis in poultry which comprises orally administering to the poultry an effective coccidiosis treatment amount of a compound diacetyl di-[4-(β-piperidinoethyl) thiosemicarbazone].

17. A method according to claim 1 in which A has from 2 to 5 carbon atoms.

18. A coccidiostat composition which comprises an effective coccidiostatic amount of a compound

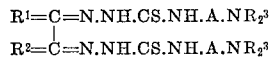

or a pharmaceutically acceptable acid addition salt thereof where $R^1$ is selected from the class consisting of hydrogen, lower alkyl, cyclohexyl, benzyl, lower alkoxy lower alkyl, acetoxymethyl and phenyl, $R^2$ is selected from the class consisting of hydrogen, lower alkyl, benzyl, and phenyl, A is alkylene having 1 to 8 carbon atoms and $NR3_2$ is selected from the class consisting of diloweralkylamino, pyrrolidino, piperdino and morpholino and a pharmaceutically acceptable carrier therefor.

19. A coccidiostat composition according to claim 18 where A has 2 to 5 carbon atoms.

20. A coccidostat composition according to claim 10 where the compound is diacetyl di-[4-β-piperidinoethyl)-thiosemicarbazone].

21. A method according to claim 6 in which the compound in diacetyl di-[4-(β-piperidinoethyl)thiosemicarbazone].

22. A method according to claim 16 in which a pharmaceutically acceptable acid addition salt of the compound is administered.

23. A method of preventing coccidiosis in poultry which comprises orally administering to the poultry an effective coccidiosis prevention amount of a compound diacetyl di-[4-(β-piperidionethyl)thiosemicarbazone].

24. A method according to claim 23 in which a pharmaceutically acceptable acid addition salt of the compound is administered.

References Cited
UNITED STATES PATENTS 3,478,036   1/1969   Winkelmann et al. ____ 424—323

SAM ROSEN, Primary Examiner

U.S. Cl. X.R.

424—274, 267, 323